(12) United States Patent
Wu

(10) Patent No.: US 8,177,966 B2
(45) Date of Patent: May 15, 2012

(54) UV LIQUID STORAGE AND DISPENSING DEVICE

(75) Inventor: Ka Shing Wu, Kwun Tong (HK)

(73) Assignee: Mr. Chiaphua Industries Limited, Tai Po, New Territories, N.T. (HK)

( * ) Notice: Subject to any disclaimer, the term of this patent is extended or adjusted under 35 U.S.C. 154(b) by 0 days.

(21) Appl. No.: 12/974,075

(22) Filed: Dec. 21, 2010

(65) Prior Publication Data

US 2011/0084006 A1    Apr. 14, 2011

Related U.S. Application Data

(63) Continuation-in-part of application No. 12/380,191, filed on Feb. 25, 2009.

(51) Int. Cl.
*C02F 1/28* (2006.01)
*C02F 1/32* (2006.01)
*C02F 1/42* (2006.01)

(52) U.S. Cl. ......... 210/88; 210/251; 210/232; 210/282; 210/473; 210/482; 210/748.11; 210/660; 210/694; 210/260; 422/186.3

(58) Field of Classification Search ................. None
See application file for complete search history.

(56) References Cited

U.S. PATENT DOCUMENTS

| | | | | |
|---|---|---|---|---|
| 3,923,663 A * | 12/1975 | Reid | .............................. | 210/251 |
| 4,066,551 A * | 1/1978 | Stern | ............................. | 210/282 |
| 4,296,328 A * | 10/1981 | Regan | .......................... | 250/436 |
| 4,828,692 A * | 5/1989 | Peranio | ......................... | 210/123 |
| 5,039,402 A * | 8/1991 | Himelstein | .................... | 210/121 |
| 5,078,876 A * | 1/1992 | Whittier et al. | ............... | 210/315 |
| 5,139,666 A * | 8/1992 | Charbonneau et al. | ........ | 210/264 |
| 5,393,419 A * | 2/1995 | Tiede et al. | .................... | 210/192 |
| 5,441,179 A * | 8/1995 | Marsh | ........................... | 222/190 |
| 5,445,729 A * | 8/1995 | Monroe et al. | .................. | 210/86 |
| 5,536,395 A * | 7/1996 | Kuennen et al. | ................ | 210/87 |
| 5,540,848 A * | 7/1996 | Engelhard | ................ | 210/748.11 |
| 5,567,308 A * | 10/1996 | Visser | ............................ | 210/232 |
| 5,597,482 A * | 1/1997 | Melyon | ......................... | 210/209 |
| 5,616,243 A * | 4/1997 | Levy | ............................. | 210/282 |
| 5,628,895 A * | 5/1997 | Zucholl | .......................... | 210/85 |
| 5,628,897 A * | 5/1997 | Phelan | ........................... | 210/94 |
| 5,637,214 A * | 6/1997 | Kahana | .......................... | 210/282 |
| D386,041 S * | 11/1997 | Tanner et al. | ................... | D7/319 |
| 5,698,091 A * | 12/1997 | Kuennen et al. | ................ | 210/87 |
| 5,730,863 A * | 3/1998 | Howlings et al. | .............. | 210/109 |
| 5,738,780 A * | 4/1998 | Markham | ....................... | 210/143 |
| 5,843,309 A * | 12/1998 | Mancil | .......................... | 210/205 |
| 5,846,418 A * | 12/1998 | Thompson et al. | ............ | 210/266 |
| 5,853,572 A * | 12/1998 | Kuennen et al. | ................ | 210/87 |
| 5,916,439 A * | 6/1999 | Oleskow | ..................... | 210/198.1 |
| 6,042,720 A * | 3/2000 | Reber et al. | ..................... | 210/85 |
| 6,099,735 A * | 8/2000 | Kelada | ........................... | 210/652 |

(Continued)

*Primary Examiner* — Robert James Popovics
(74) *Attorney, Agent, or Firm* — Alix, Yale & Ristas, LLP

(57) ABSTRACT

A liquid storage and dispensing device with a filter for removing minerals and a UV light source for killing pathogens existing in a liquid. A liquid is introduced into the device via the inlet. The liquid passes through the filter into a collector. The filtered liquid flows from the collector through a thru passage into a UV chamber. The UV light source emits UV rays through a UV transmissive wall into the interior portion of the UV chamber. Exposure to the UV light kills pathogens present in the filtered liquid. Substantially purified liquid can then be dispensed from an outlet.

14 Claims, 4 Drawing Sheets

U.S. PATENT DOCUMENTS

| | | | | |
|---|---|---|---|---|
| 6,110,424 | A * | 8/2000 | Maiden et al. | 210/748.11 |
| 6,120,691 | A * | 9/2000 | Mancil | 210/748.11 |
| 6,180,003 | B1 * | 1/2001 | Reber et al. | 210/198.1 |
| 6,193,894 | B1 * | 2/2001 | Hollander | 210/748.11 |
| 6,299,770 | B1 * | 10/2001 | Diener et al. | 210/252 |
| 6,387,260 | B1 * | 5/2002 | Pimenov et al. | 210/282 |
| 6,405,875 | B1 * | 6/2002 | Cutler | 210/477 |
| 6,451,202 | B1 * | 9/2002 | Kuennen et al. | 210/136 |
| 6,475,352 | B2 * | 11/2002 | Conrad | 204/176 |
| 6,485,644 | B2 * | 11/2002 | Bowler | 210/282 |
| 6,491,811 | B2 * | 12/2002 | Conrad et al. | 210/85 |
| 6,491,868 | B2 * | 12/2002 | Kuennen et al. | 422/24 |
| 6,491,879 | B2 * | 12/2002 | Conrad | 422/186.18 |
| 6,514,405 | B1 * | 2/2003 | Lifschitz | 210/143 |
| 6,514,420 | B2 * | 2/2003 | Kuennen et al. | 210/748.11 |
| 6,524,477 | B1 * | 2/2003 | Hughes | 210/282 |
| 6,569,319 | B2 * | 5/2003 | Kuennen et al. | 210/85 |
| 6,602,425 | B2 * | 8/2003 | Gadgil et al. | 210/744 |
| 6,649,045 | B2 * | 11/2003 | Tanner et al. | 210/85 |
| 6,767,453 | B2 * | 7/2004 | Lifschitz | 210/85 |
| 6,773,608 | B1 * | 8/2004 | Hallett et al. | 210/748.11 |
| 6,793,817 | B2 * | 9/2004 | Kuennen et al. | 210/232 |
| 6,811,691 | B2 * | 11/2004 | Woodard et al. | 210/232 |
| 6,861,652 | B2 * | 3/2005 | Wismeth | 250/455.11 |
| 6,881,327 | B2 * | 4/2005 | Tanner et al. | 210/85 |
| 6,909,101 | B2 * | 6/2005 | Nishioka | 250/436 |
| 6,953,523 | B2 * | 10/2005 | Vandenbelt et al. | 210/85 |
| 7,002,140 | B2 * | 2/2006 | Elsegood et al. | 250/251 |
| 7,081,225 | B1 * | 7/2006 | Hollander | 210/748.11 |
| 7,232,517 | B1 * | 6/2007 | Shepherd | 210/94 |
| 7,361,904 | B2 * | 4/2008 | Cassassuce et al. | 250/436 |
| 7,438,799 | B2 * | 10/2008 | Vandenbelt et al. | 210/85 |
| 7,476,312 | B2 * | 1/2009 | Laing et al. | 210/109 |
| 7,632,397 | B2 * | 12/2009 | Bathula | 210/86 |
| 7,708,958 | B2 * | 5/2010 | Namespetra et al. | 422/300 |
| 7,713,496 | B2 * | 5/2010 | Harris | 422/186.3 |
| 7,837,865 | B2 * | 11/2010 | Wadstrom | 210/85 |
| 7,906,019 | B2 * | 3/2011 | Elliott et al. | 210/205 |
| 7,959,872 | B2 * | 6/2011 | Namespetra et al. | 422/300 |
| 8,043,502 | B2 * | 10/2011 | Nauta | 210/232 |
| 8,048,316 | B2 * | 11/2011 | Denkewicz, Jr. | 210/748.16 |
| 8,066,940 | B2 * | 11/2011 | Denkewicz et al. | 422/24 |
| 8,128,820 | B2 * | 3/2012 | Wu | 210/251 |
| 2001/0006162 | A1 * | 7/2001 | Hollander | 210/748 |
| 2002/0060175 | A1 * | 5/2002 | Conrad et al. | 210/85 |
| 2002/0060177 | A1 * | 5/2002 | Conrad | 210/203 |
| 2002/0060189 | A1 * | 5/2002 | Conrad | 210/739 |
| 2002/0060190 | A1 * | 5/2002 | Conrad | 210/739 |
| 2002/0061265 | A1 * | 5/2002 | Conrad | 422/186.07 |
| 2002/0070153 | A1 * | 6/2002 | Bowler | 210/245 |
| 2002/0113022 | A1 * | 8/2002 | Gadgil et al. | 210/748 |
| 2002/0131906 | A1 * | 9/2002 | Wismeth | 422/105 |
| 2002/0134715 | A1 * | 9/2002 | Tanner et al. | 210/85 |
| 2002/0162779 | A1 * | 11/2002 | Kuennen et al. | 210/109 |
| 2002/0189986 | A1 * | 12/2002 | Kuennen et al. | 210/109 |
| 2003/0000878 | A1 * | 1/2003 | Woodard et al. | 210/175 |
| 2003/0000879 | A1 * | 1/2003 | Snyder | 210/175 |
| 2003/0000880 | A1 * | 1/2003 | Kool et al. | 210/175 |
| 2003/0006180 | A1 * | 1/2003 | Taylor, Jr. | 210/175 |
| 2003/0010695 | A1 * | 1/2003 | Kool et al. | 210/192 |
| 2003/0019803 | A1 * | 1/2003 | Woodard et al. | 210/175 |
| 2004/0060873 | A1 * | 4/2004 | Yanou et al. | 210/660 |
| 2004/0140435 | A1 * | 7/2004 | Nishioka | 250/436 |
| 2004/0149643 | A1 * | 8/2004 | Vandenbelt et al. | 210/282 |
| 2004/0173507 | A1 * | 9/2004 | Tanner et al. | 210/85 |
| 2005/0167611 | A1 * | 8/2005 | Elsegood et al. | 250/435 |
| 2005/0247609 | A1 * | 11/2005 | Laing et al. | 210/109 |
| 2006/0163169 | A1 * | 7/2006 | Eckhardt et al. | 210/748 |
| 2006/0163174 | A1 * | 7/2006 | Namespetra et al. | 210/760 |
| 2006/0191824 | A1 * | 8/2006 | Arett et al. | 210/85 |
| 2006/0226064 | A1 * | 10/2006 | Beckman et al. | 210/323.1 |
| 2006/0231476 | A1 * | 10/2006 | Vandenbelt et al. | 210/266 |
| 2006/0249442 | A1 * | 11/2006 | Yap et al. | 210/470 |
| 2007/0075006 | A1 * | 4/2007 | Watanabe et al. | 210/181 |
| 2007/0209984 | A1 * | 9/2007 | Lev et al. | 210/143 |
| 2007/0262010 | A1 * | 11/2007 | Wadstrom | 210/175 |
| 2007/0278141 | A1 * | 12/2007 | Patera et al. | 210/110 |
| 2008/0067414 | A1 * | 3/2008 | Cassassuce et al. | 250/435 |
| 2008/0110820 | A1 * | 5/2008 | Knipmeyer et al. | 210/474 |
| 2008/0116146 | A1 * | 5/2008 | Herrington et al. | 210/748 |
| 2008/0202996 | A1 * | 8/2008 | Oranski et al. | 210/143 |
| 2008/0217252 | A1 * | 9/2008 | Elliott et al. | 210/661 |
| 2008/0314808 | A1 * | 12/2008 | Vandenbelt et al. | 210/85 |
| 2009/0039032 | A1 * | 2/2009 | Patera et al. | 210/760 |
| 2009/0057220 | A1 * | 3/2009 | Nauta | 210/282 |
| 2009/0071890 | A1 * | 3/2009 | Oranski et al. | 210/234 |
| 2009/0200215 | A1 * | 8/2009 | Bathula | 210/85 |
| 2010/0102002 | A1 * | 4/2010 | O'Brien et al. | 210/668 |
| 2010/0133297 | A1 * | 6/2010 | Arett et al. | 222/129 |
| 2010/0155339 | A1 * | 6/2010 | Gunter | 210/739 |
| 2010/0163470 | A1 * | 7/2010 | Oranski et al. | 210/141 |
| 2010/0176037 | A1 * | 7/2010 | Namespetra et al. | 210/85 |
| 2010/0215552 | A1 * | 8/2010 | Wu | 422/186.3 |
| 2010/0243582 | A1 * | 9/2010 | Riedel et al. | 210/767 |
| 2010/0243583 | A1 * | 9/2010 | Riedel et al. | 210/767 |
| 2010/0314306 | A1 * | 12/2010 | Wadstrom | 210/175 |
| 2011/0084006 | A1 * | 4/2011 | Wu | 210/85 |
| 2011/0303589 | A1 * | 12/2011 | Kuennen et al. | 210/95 |

* cited by examiner

UV LIQUID STORAGE AND DISPENSING DEVICE

CROSS REFERENCE TO RELATED APPLICATION

This application is a continuation-in-part of U.S. patent application Ser. No. 12/380,191, filed Feb. 25, 2009, the contents of which is incorporated herein by reference in its entirety.

FIELD

The present disclosure relates generally to a liquid storage and dispensing device for water and the like, such as a pitcher, and more particularly to a liquid storage and dispensing device that filters incoming water and treats it with UV light prior to dispensing.

BACKGROUND

Pitchers that employ interior gravity filters to remove certain naturally occurring minerals from water are known. Such filtration devices are typically capable of removing minerals such as chlorine and metals, thus leaving behind bacteria and other potential pathogens. Consequently, there exists a need for a device that can remove both minerals and pathogens from water prior to dispensing for drinking.

SUMMARY

A liquid storage and dispensing device has a liquid chamber positioned between an inlet and an outlet. The liquid chamber, inlet and outlet are in fluid communication with each other. The inlet receives incoming liquid and the outlet dispenses outgoing liquid. The liquid chamber has a filtration unit for filtering minerals from the incoming liquid. Downstream from the filtration unit is a UV light source that emits UV rays into the filtered liquid. All of the liquid entering the inlet passes through the filtration unit and is exposed to the emitted UV rays prior to being dispensed from the outlet. Exposure to the UV rays kills pathogens present in the liquid. Substantially purified liquid can then be dispensed from the outlet.

BRIEF DESCRIPTION OF THE DRAWINGS

In the accompanying drawing, like elements are numbered alike in the several Figures.

DETAILED DESCRIPTION

With reference to the drawings wherein like numerals represent like parts throughout the Figures, a liquid storage and dispensing device 10 is preferably a pitcher used to filter, store and dispense water for drinking, but is not limited as such. Embodiments of the liquid storage and dispensing device filter out minerals from and kill pathogens found in typical water sources, such as tap water, prior to dispensing for drinking.

Figure 1:
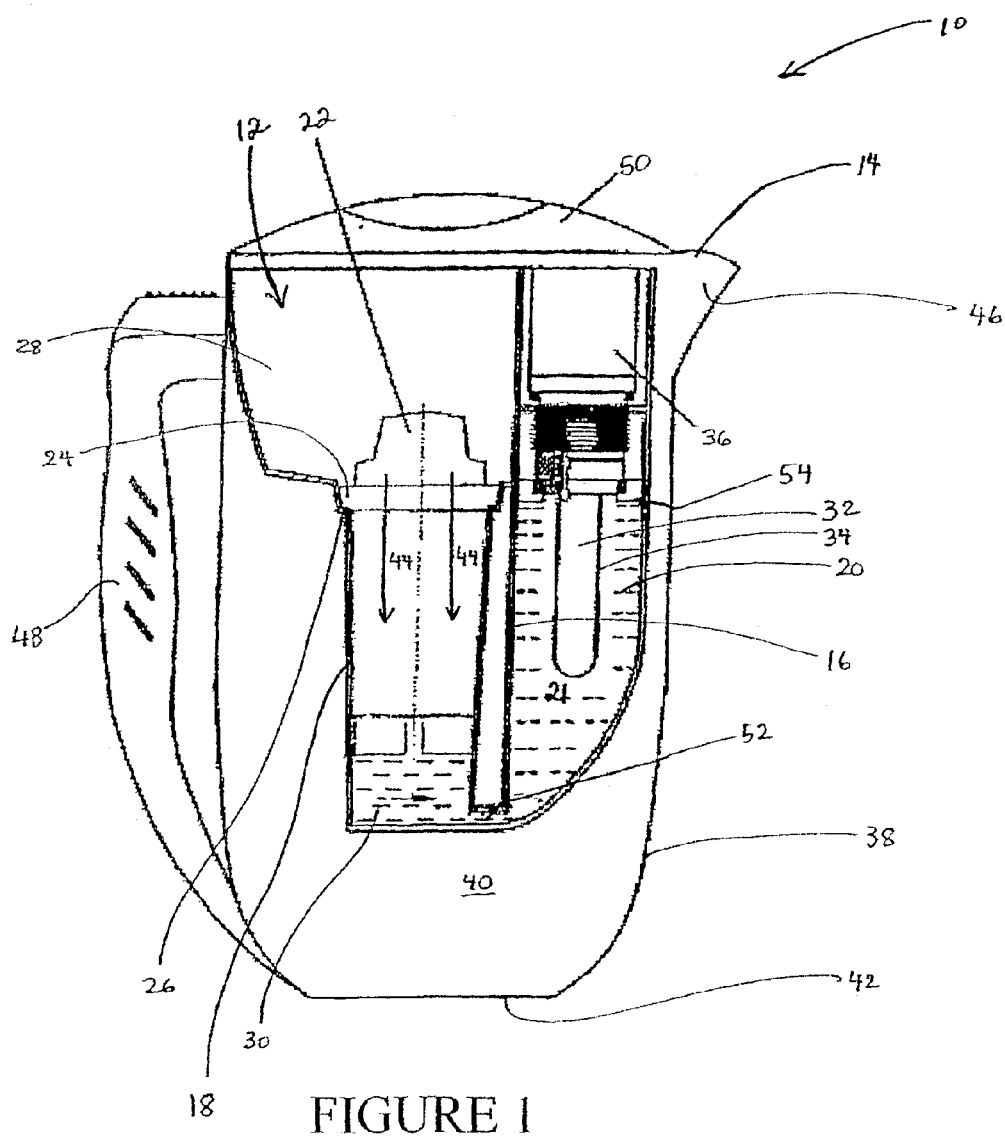
FIG. 1 is an axial section view, partly in schematic, of an embodiment of the liquid storage and dispensing device together with a liquid to further illustrate the operation of the device.

In the FIG. 1 embodiment, the device 10 has an inlet 12 and an outlet 14 separated by a liquid chamber 16. As can be seen, the inlet 12, outlet 14 and liquid chamber 16 are in fluid communication with each other. The liquid chamber 16 comprises a filtration compartment 18 and a UV compartment 20. In this embodiment, the filtration compartment 18 is upstream of the UV compartment 20, however the disclosure is not limited to this relative orientation.

Figure 2:
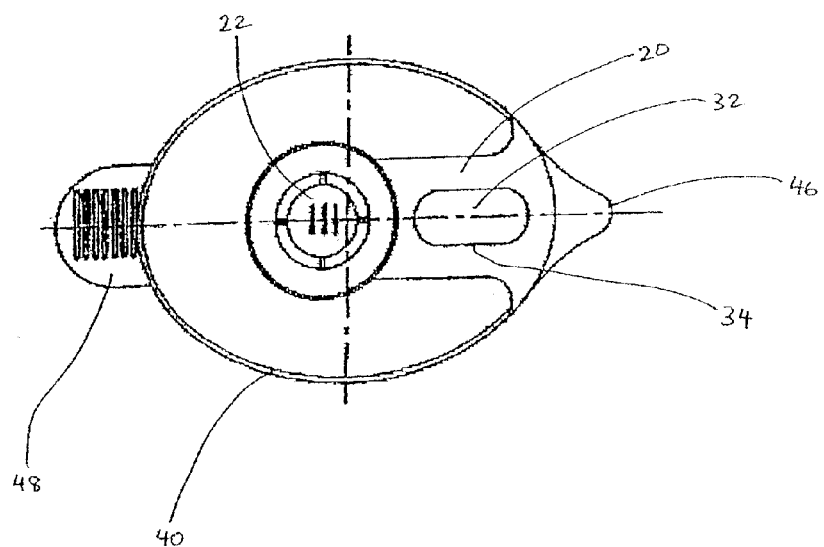
FIG. 2 is a simple plan view of the liquid storage and dispensing device of FIG. 1.

Disposed within the filtration compartment 18 is a filter 22. As shown in FIG. 2, the filter 22 of this embodiment has a circular cross section. The filter 22 also includes a radial extension 24. The filtration compartment 18 is fit with a corresponding radial notch 26 within which the filter radial extension 24 rests when the filter 22 is installed in the device. Preferably the filter is removable and replaceable. In this embodiment, the filter 22 can simply be lifted out from the filtration compartment 18. The same filter 22 or a new filter of like shape can be installed by positioning within the filtration compartment 18 with the radial extension 24 engaged with the radial notch 26. Consequently, a filter that loses effectiveness due to use over time can easily be replaced with a fresh filter. In this embodiment, when the filter 22 is installed, the filter 22 separates the filtration compartment into a reservoir 28 and a collector 30.

In this embodiment, the UV compartment has an elongated shape and a downwardly projecting hollow portion 32. Here, the hollow portion 32 is tubular in shape with a generally round-shaped cross section. The hollow portion 32 has UV transmissive walls 34 and projects downward into the UV compartment 20. The hollow portion 32 is preferably located toward the axial center of the UV compartment 20.

Also disposed within the UV compartment is a UV light unit 36. The UV light unit 36 is positioned to emit UV rays through the UV transmissive walls 34 into the UV compartment interior portion 21. Preferably, the UV light unit 36 is removable and utilizes a rechargeable power source, such as a battery. In a preferred embodiment the UV light unit 36 emits ultraviolet-C waves or employs a UV-C bulb.

UV-C light exposure is known to kill pathogens such as bacteria and even viruses by penetrating the thin walls of the pathogens and altering their genetic structure, ultimately resulting in death. Some nonlimiting examples of such pathogens include those that cause influenza, strep throat, colds, staph infections and tuberculosis. UV-C light is also known to kill the *Escherichia coli* bacterium (*E. coli*), a bacterium commonly found in water supplies. Further, many UV-C light bulbs have long operating lives, equating to thousands of hours of use prior to replacement.

This embodiment also features a housing 38. The housing 38 comprises a body 40, a base 42, a spout 46 and a handle 48. A removable cover 50 can be placed on the top of the housing 38 to help prevent spillage or contamination of the device by outside particles.

In this embodiment, liquid such as tap water is introduced into the device 10 at the inlet 12. The liquid subsequently passes through the filter 22 via gravitational forces. The rate that liquid is introduced into the device 10 is generally greater than the rate of filtration through the filter 22. Consequently, the liquid builds up in the reservoir 28. As the liquid passes through the filter 22, minerals such as metals and chlorine are filtered out of the liquid and the filtered liquid enters the collector 30. The flow of liquid through the filter 22 is represented by arrows 44 in FIG. 1.

As the collector 30 fills up, and provided there is liquid in the reservoir, the filtered liquid will flow from the collector 30 through the passage 52 to the UV compartment 20. While in the UV compartment 20, the liquid is exposed to the UV rays emitted from the UV light unit 36. Exposure to the UV rays kills nearly all of the pathogens present in the filtered liquid. A user can then dispense substantially purified liquid from the outlet 14 by tipping the spout 46 downward.

Alternatively, prior to liquid building up in the collector 30 and while liquid is passing through the filter 22, a user can tip the spout end of the device 10 downward, affecting a flow of filtered liquid from the collector 30 through the passage 52 to the UV compartment 20 and out the outlet 14. As can be seen in FIG. 1, in this embodiment, the UV compartment 20 has an exit opening 54. The passage 52 and the exit opening 54 have relatively narrow diameters to control the liquid flow rate through the UV compartment. Each diameter is configured to slow the flow of liquid through the UV chamber. All of the liquid flowing through the UV chamber is exposed to the UV rays for a duration long enough to kill at least 99% of the pathogens present in the liquid.

Test Results

Two aqueous samples of E. coli were prepared and passed through a device such as that depicted in FIG. 1. The samples were subjected to (a) filtration alone; and (b) filtration followed by UV-C light exposure. The results are summarized in Table 1:

TABLE 1

| Original sample | Filter with UV lamp off | | Filter with UV lamp on | |
|---|---|---|---|---|
| E. coli conc. (cfu/mL) | E. coli conc. (cfu/mL) | Reduction efficiency | E. coli conc. (cfu/mL) | Reduction efficiency |
| 270,000 | 210,000 | 22.2% | 440 | 99.8% |
| 350,000 | 220,000 | 37.1% | 1,100 | 99.7% |

As Table 1 shows, when the sample was subjected to both filtration and UV exposure in the device, the device was capable of reducing the concentration of E. coli by over 99%.

As noted above, the UV light unit 36 is preferably removable and rechargeable. One embodiment of the UV light unit 36 utilizes a UV-C lamp operating on rechargeable VDC batteries. The batteries can be held in a casing along with a UV bulb that can be removed from the device 10. The batteries can be then be recharged with an AC/DC converter. Other known rechargeable power sources can be substituted for the VDC batteries.

Figure 3:
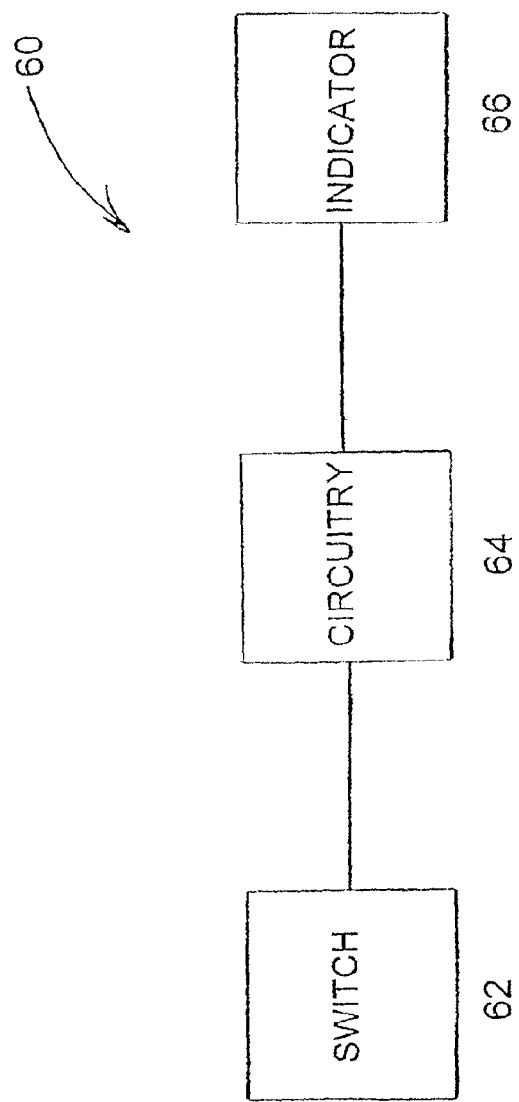
FIG. 3 is a flow chart showing an embodiment of a safety mechanism for use in conjunction with the disclosed device.

Embodiments exist that utilize safety mechanisms to help ensure that the UV light unit 36 is properly engaged prior to use. For instance, one embodiment provides an audible and/or visible warning when the light source is not properly engaged with the device. With reference to FIG. 3, an embodiment of the safety mechanism 60 comprises a sensor switch 62, internal circuitry 64 and an indicator 66. Nonlimiting examples of a suitable sensor switch include an on/off micro switch or a magnetic sensitive switch. When the UV light unit is not properly engaged with the device 10, the switch electronically triggers an indicator alerting the user. In one example, the switch triggers an LED to light up. Another embodiment exists wherein the internal circuitry measures the battery capacity and triggers an alert if the capacity is too low to support the UV lamp. In another preferred embodiment, the safety mechanism prevents the UV light unit 36 from illuminating if the UV light unit 36 is not properly engaged prior to use.

Figure 4:
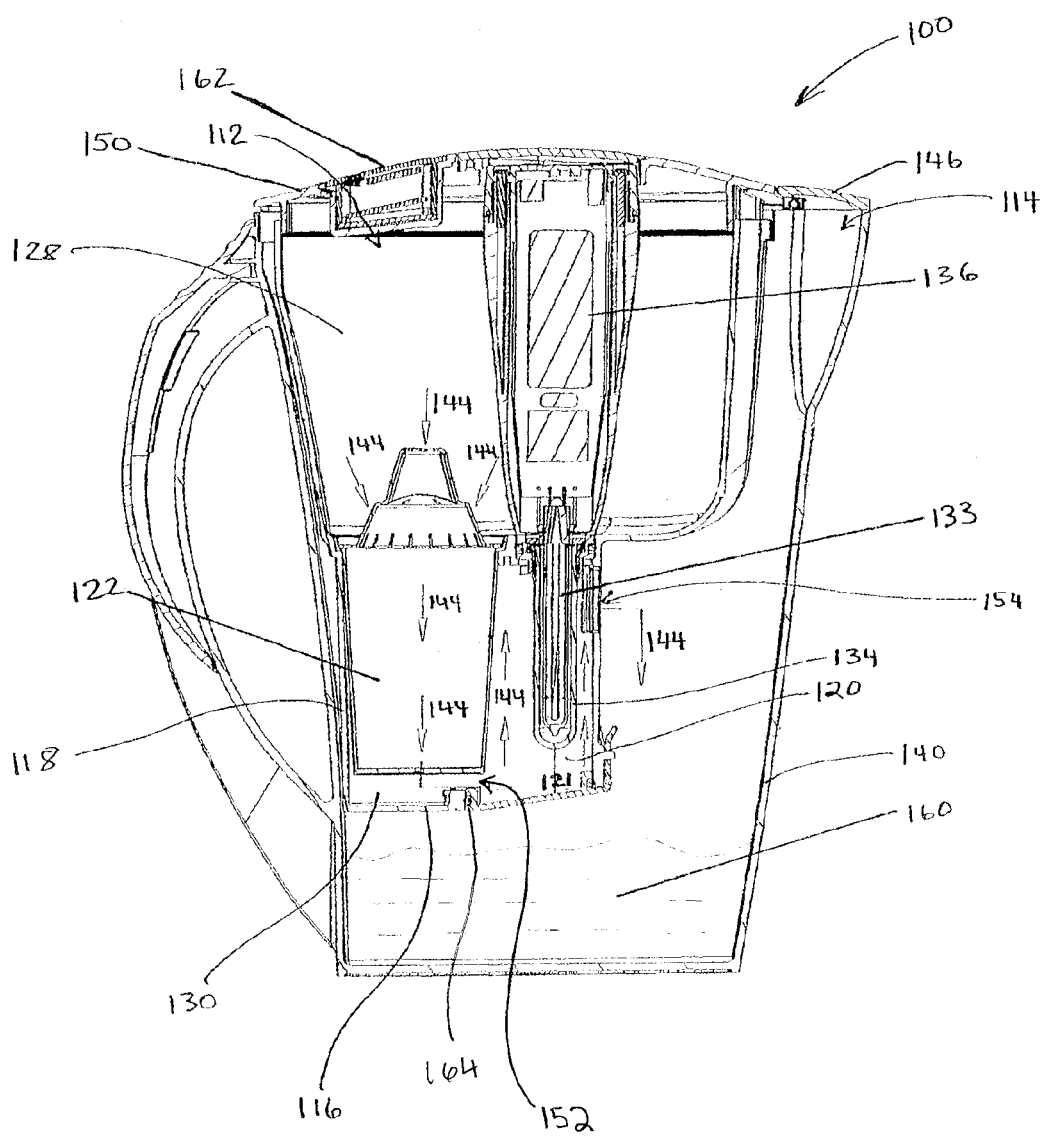
FIG. 4 is an axial section view, partially in schematic, of another embodiment of the liquid storage and dispensing device.

Another embodiment of the disclosed liquid storage and dispensing device 100 is shown in FIG. 4. As can be seen, the passage 52 has been replaced by a simple gap opening 152 between an outer bottom surface of said filter 122 and a protrusion 164 extending upwardly from a bottom surface of chamber 116, placing the collector 130 and the UV compartment 120 in fluid communication. In this embodiment, the typical flow of liquid through the device 100 is represented by the arrows 144. As can be seen, liquid is added to the incoming reservoir 128 via inlet 112. The liquid then passes through the filter 122 (which is disposed within the filtration compartment 118) to the collector 130, then to the interior portion 121 of the UV compartment 120.

The liquid experiences UV radiation from the UV lamp 133 while the liquid is within the UV compartment interior portion 121. Like the previous embodiment, a UV transmissive wall 134 separates the interior portion 121 from the lamp 133. In this embodiment, the duration that the liquid experiences UV radiation can be regulated by the configuration of the UV compartment 120, including the size of the thru passage 152 and exit opening 154. Any other openings along the liquid path 144 can be configured (size, shape) to control the duration of time that filtered liquid is kept under UV radiation. Of course the duration of time should be sufficient to eradicate bacteria in the liquid.

Liquid flows from the UV compartment 120 through the exit opening 154 and collects in the collection reservoir 160. Treated liquid can be stored in the collection reservoir 160 until it is poured from the outlet 114 via the spout 146.

This embodiment also features a count down meter 162 proximate the inlet 112 for monitoring use and alerting a user when the filter 122 should be replaced. The count down meter 162 can be part of the cover 150 or integrated into the housing body 140 or the liquid chamber 116. One embodiment of the meter 162 has a button which is pressed by a user at the start of every liquid treatment, and a display that shows the number of safe uses left.

While a preferred embodiment of the disclosed UV liquid storage and dispensing device has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A water pitcher purifier comprising:
   a water pitcher having a base, body, handle and spout;
   an incoming reservoir housed in an upper portion of said body for receiving water to be treated or purified, said reservoir having an opening in a bottom wall thereof;
   a chamber located completely beneath said incoming reservoir and having a protrusion extending upwardly from a bottom surface of said chamber, said chamber having an exit opening in a sidewall thereof;
   a filter extending through said incoming reservoir opening into said chamber, said filter having an inlet in fluid communication with said incoming reservoir, said filter having an outlet at a lower end thereof, a gap opening is defined between said protrusion and an outer bottom surface of said filter; and
   an ultraviolet light source which emits ultraviolet light capable of killing pathogens present in water being treated, said protrusion and said filter divide said chamber into a collector compartment located beneath said filter and an ultraviolet treatment compartment adjacent said filter where said ultraviolet light source is housed;

wherein water to be treated or purified is introduced into said incoming reservoir and follows a liquid flow path having a plurality of openings in addition to said gap opening, flowing through said filter into said collector compartment, then through said gap opening into said ultraviolet treatment compartment where the filtered water is subjected to pathogen killing ultraviolet light, and then out through said exit opening into a lower collection reservoir adjacent said base where treated water is stored until it is dispensed through said spout.

2. The water pitcher of claim 1, wherein the filter is removable and replaceable.

3. The water pitcher purifier of claim 1, wherein the filter comprises granular activated carbon and ion exchange resin.

4. The water pitcher purifier of claim 1, wherein the gap opening and the exit opening are sufficiently narrow so that filtered water remains in the ultraviolet treatment compartment for a duration sufficient for the ultraviolet light to kill 99% of the pathogens present in the water prior to dispensing from the exit opening.

5. The water pitcher purifier of claim 1, wherein the ultraviolet light source is removable and replaceable.

6. The water pitcher purifier of claim 1 or 5, wherein the ultraviolet light source further comprises a rechargeable power source.

7. The water pitcher purifier of claim 1, further comprising a safety device that prevents the ultraviolet light source from illuminating when the ultraviolet light source is not properly engaged.

8. The water pitcher purifier of claim 1, wherein the ultraviolet light source further comprises a rechargeable power source and a safety device that measures the capacity of said power source and provides a warning when the power source is too low to power the ultraviolet light source and/or when the power source is too low to complete a coming sterilizing cycle by ultraviolet light.

9. The water pitcher purifier of claim 1, wherein the ultraviolet light source emits light in the ultraviolet-C frequency.

10. The water pitcher purifier of claim 1, further comprising a meter for recording the number times that the purifier is used and providing notification to a user.

11. The water pitcher purifier of claim 10, wherein the meter provides notification to a user in terms of the number of safe uses remaining before an element of the purifier should be replaced.

12. The water pitcher purifier of claim 1, wherein the duration of time that the liquid being treated is exposed to ultraviolet radiation is regulated by the shape or cross-sectional area of at least one opening in said liquid flow path.

13. The water pitcher purifier of claim 12, wherein the duration of time that the liquid being treated is exposed to ultraviolet radiation is regulated by the shape or cross-sectional area of all openings in said liquid flow path.

14. The water pitcher purifier of claim 12, wherein the duration of time that the liquid being treated is exposed to ultraviolet radiation is regulated by the shape or cross-sectional area of said gap opening in said liquid flow path.

* * * * *